US008108655B2

(12) United States Patent
Abernathy et al.

(10) Patent No.: US 8,108,655 B2
(45) Date of Patent: Jan. 31, 2012

(54) SELECTING FIXED-POINT INSTRUCTIONS TO ISSUE ON LOAD-STORE UNIT

(75) Inventors: Christopher Michael Abernathy, Austin, TX (US); James Wilson Bishop, Newark Valley, NY (US); Mary Douglass Brown, Austin, TX (US); William Elton Burky, Austin, TX (US); Robert Allen Cordes, Austin, TX (US); Hung Qui Le, Austin, TX (US); Dung Quoc Nguyen, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/410,073

(22) Filed: Mar. 24, 2009

(65) Prior Publication Data

US 2010/0250901 A1 Sep. 30, 2010

(51) Int. Cl.
*G06F 9/302* (2006.01)
*G06F 9/312* (2006.01)
(52) U.S. Cl. ........................ 712/214; 712/207
(58) Field of Classification Search .................. 712/214, 712/207
See application file for complete search history.

(56) References Cited

U.S. PATENT DOCUMENTS

| 6,463,524 | B1 * | 10/2002 | Delaney et al. | 712/221 |
|---|---|---|---|---|
| 7,237,094 | B2 | 6/2007 | Curran et al. | 712/213 |
| 7,278,011 | B2 | 10/2007 | Eisen et al. | 712/218 |
| 2003/0014613 | A1 | 1/2003 | Soni | 712/217 |
| 2003/0182537 | A1 | 9/2003 | Le et al. | 712/216 |
| 2007/0083742 | A1 | 4/2007 | Abernathy et al. | 712/244 |
| 2007/0118726 | A1 | 5/2007 | Abernathy et al. | 712/225 |
| 2007/0124722 | A1 * | 5/2007 | Gschwind | 717/106 |
| 2007/0168727 | A1 * | 7/2007 | Fournier et al. | 714/25 |
| 2008/0072018 | A1 | 3/2008 | Le et al. | 712/217 |
| 2008/0141000 | A1 | 6/2008 | Floyd et al. | 712/216 |
| 2008/0189535 | A1 | 8/2008 | Agarwal et al. | 712/245 |
| 2009/0198974 | A1 * | 8/2009 | Barowski et al. | 712/222 |

OTHER PUBLICATIONS

Mading et al.; "The Vector Fixed Point Unit of The Synergistic Processor Element of The Cell Architecture Processor", 3-9810801-0-6/DATE06 © 2006 EDAA.

* cited by examiner

*Primary Examiner* — Daniel Pan
(74) *Attorney, Agent, or Firm* — VanLeeuwen & VanLeeuwen; Diana R. Gerhardt

(57) ABSTRACT

Issue logic identifies a simple fixed point instruction, included in a unified payload, which is ready to issue. The simple fixed point instruction is a type of instruction that is executable by both a fixed point execution unit and a load-store execution unit. In turn, the issue logic determines that the unified payload does not include a load-store instruction that is ready to issue. As a result, the issue logic issues the simple fixed point instruction to the load-store execution unit in response to determining that the simple fixed point instruction is ready to issue and determining that the unified payload does not include a load-store instruction that is ready to issue.

20 Claims, 7 Drawing Sheets

Unified Payload — 210

| # | LS | SFX | FX | Instruction |
|---|----|-----|----|-------------|
| 0 | 1 | 0 | 0 | |
| 1 | 1 | 0 | 0 | |
| 2 | 0 | 1 | 1 | |
| 3 | 0 | 0 | 1 | |
| 4 | 0 | 1 | 1 | |
| 5 | 0 | 0 | 1 | |
| 6 | 0 | 0 | 1 | |
| 7 | 1 | 0 | 0 | |
| 8 | 0 | 1 | 1 | |
| 9 | 1 | 0 | 0 | |

Load-Store Inst. Type Vector — 305

| 0 | 1 | 2 | 3 | 4 | 5 | 6 | 7 | 8 | 9 |
|---|---|---|---|---|---|---|---|---|---|
| 1 | 1 | 0 | 0 | 0 | 0 | 0 | 1 | 0 | 1 |

*FIG. 4C*

Simple Fixed Point Inst. Type Vector — 315

| 0 | 1 | 2 | 3 | 4 | 5 | 6 | 7 | 8 | 9 |
|---|---|---|---|---|---|---|---|---|---|
| 0 | 0 | 1 | 0 | 1 | 0 | 0 | 0 | 1 | 0 |

*FIG. 4D*

Fixed Point Inst. Type Vector — 325

| 0 | 1 | 2 | 3 | 4 | 5 | 6 | 7 | 8 | 9 |
|---|---|---|---|---|---|---|---|---|---|
| 0 | 0 | 1 | 1 | 1 | 1 | 1 | 0 | 1 | 0 |

Ready Vector — 300

| 0 | 1 | 2 | 3 | 4 | 5 | 6 | 7 | 8 | 9 |
|---|---|---|---|---|---|---|---|---|---|
| 0 | 0 | 1 | 0 | 1 | 0 | 1 | 0 | 1 | 0 |

*FIG. 5A*

Qualified Load-Store Inst. Vector — 345

| 0 | 1 | 2 | 3 | 4 | 5 | 6 | 7 | 8 | 9 |
|---|---|---|---|---|---|---|---|---|---|
| 0 | 0 | 0 | 0 | 0 | 0 | 0 | 0 | 0 | 0 |

*FIG. 5B*

Qualified Simple Fixed Point Inst. Vector — 350

| 0 | 1 | 2 | 3 | 4 | 5 | 6 | 7 | 8 | 9 |
|---|---|---|---|---|---|---|---|---|---|
| 0 | 0 | 1 | 0 | 1 | 0 | 0 | 0 | 1 | 0 |

*FIG. 5C*

Qualified Fixed Point Inst. Vector — 355

| 0 | 1 | 2 | 3 | 4 | 5 | 6 | 7 | 8 | 9 |
|---|---|---|---|---|---|---|---|---|---|
| 0 | 0 | 1 | 0 | 1 | 0 | 1 | 0 | 1 | 0 |

*FIG. 5D*

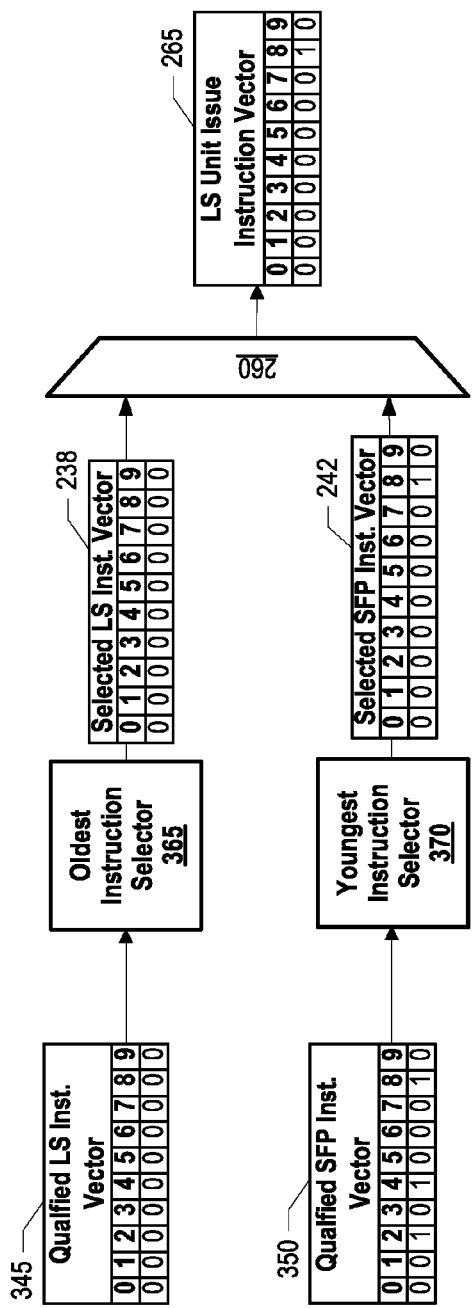
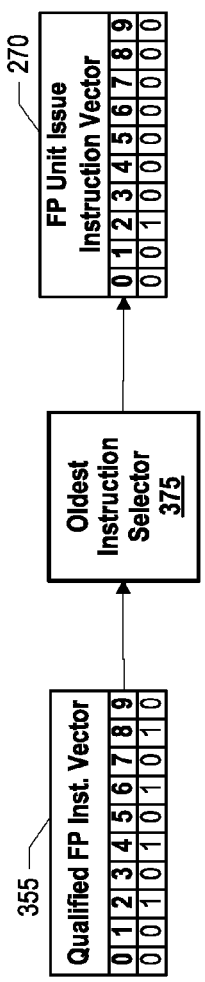
FIG. 6A
FIG. 6B

SELECTING FIXED-POINT INSTRUCTIONS TO ISSUE ON LOAD-STORE UNIT

GOVERNMENT RIGHTS

This invention was made with United States Government support under Agreement No. HR0011-07-9-002 awarded by DARPA. The Government has certain rights in the invention.

BACKGROUND OF THE INVENTION

1. Technical Field

The present invention relates to selecting fixed point instructions to issue on a load-store execution unit. More particularly, the present invention relates to selecting a simple fixed point instruction to issue on a load-store execution unit when a load-store instruction is unavailable to issue.

2. Description of the Related Art

Computer systems include dispatch logic that fetches instructions from memory and places the instructions into an issue queue. In turn, issue logic schedules the issue queue's instructions to an execution unit. Issue logic scheduling consists of two steps, which are a wake-up step and a selection step. The issue logic's wake-up step determines when an instruction is ready to issue, and the issue logic's selection step selects one of the ready-to-issue instructions.

Many computer systems use a different issue queue for each execution unit type, such as using a load-store issue queue for load-store instructions that execute on a load-store execution unit and using a fixed point issue queue for fixed point instructions that execute on a fixed point execution unit. For these computer systems, the dispatch logic pre-destines each instruction to a specific execution unit when the dispatch logic places the instruction into a particular issue queue.

SUMMARY

Issue logic identifies a simple fixed point instruction, included in a unified payload, which is ready to issue. The simple fixed point instruction is a type of instruction that is executable by both a fixed point execution unit and a load-store execution unit. In turn, the issue logic determines that the unified payload does not include a load-store instruction that is ready to issue. As a result, the issue logic issues the simple fixed point instruction to the load-store execution unit in response to determining that the simple fixed point instruction is ready to issue and determining that the unified payload does not include a load-store instruction that is ready to issue.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4A is an exemplary diagram of a unified payload that holds different instruction types;

FIG. 4B is an exemplary diagram of a load-store instruction type vector that identifies load-store instruction type instructions within a unified;

FIG. 4C is an exemplary diagram of a simple fixed point instruction type vector that identifies simple fixed point instruction type instructions within a unified payload;

FIG. 4D is an exemplary diagram of a fixed point instruction type vector that identifies fixed point instruction type instructions within a unified payload;

FIG. 5A is an exemplary diagram of a ready vector that identifies instructions that are ready to issue;

FIG. 5B is an exemplary diagram of a qualified load-store instruction vector that identifies load-store instructions that are ready to issue;

FIG. 5C is an exemplary diagram of a qualified simple fixed point instruction vector that identifies simple fixed point instructions that are ready to issue;

FIG. 5D is an exemplary diagram of a fixed point qualified vector that identifies fixed point instructions that are ready to issue;

FIG. 6A is an exemplary diagram of a multiplexer selecting a simple fixed point instruction to issue when a load-store instruction is not available to issue;

FIG. 6B is an exemplary diagram an oldest instruction selector identifying an oldest fixed point instruction that is ready to issue.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

Figure 1:
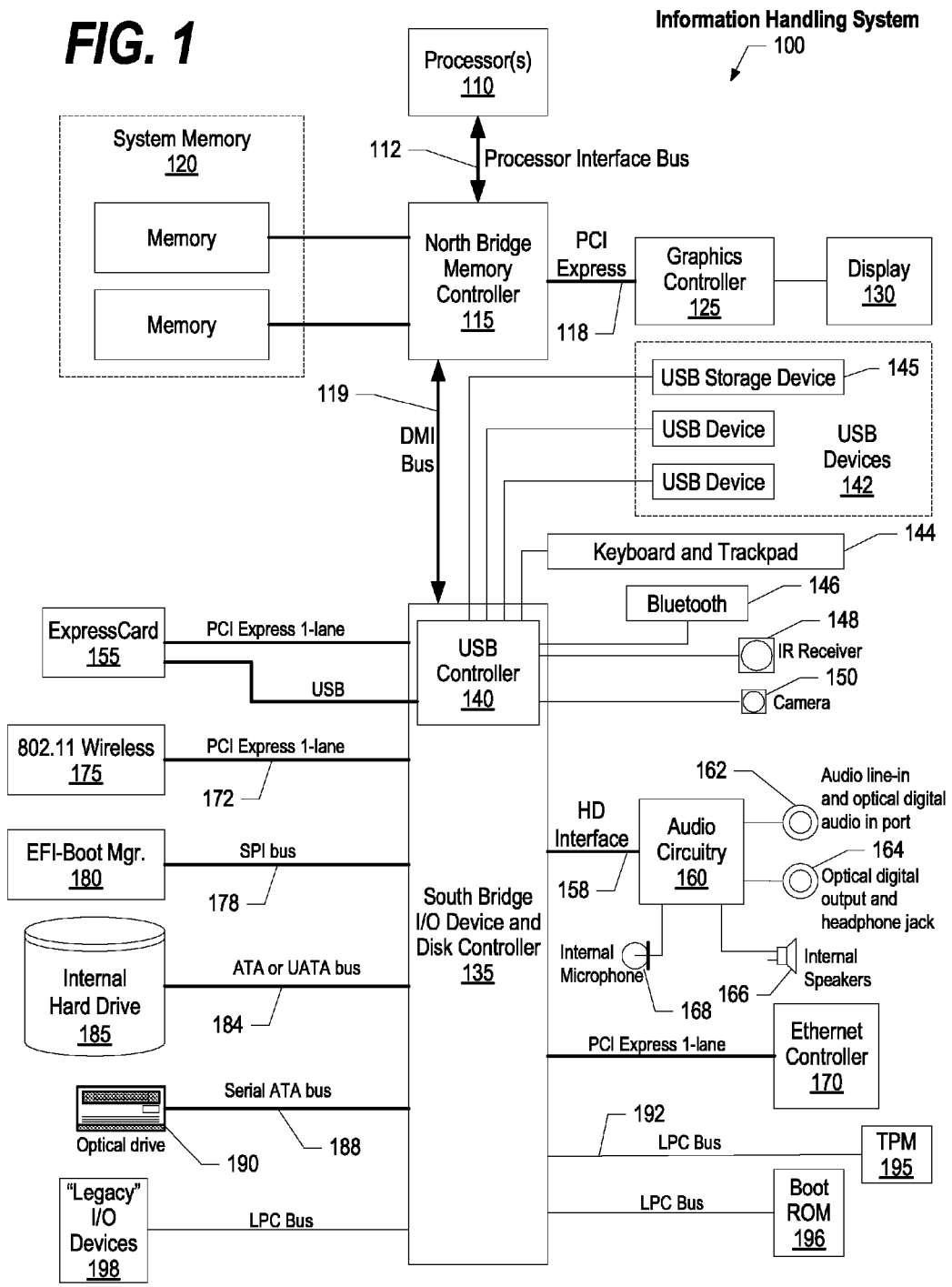
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems.

Figure 2:
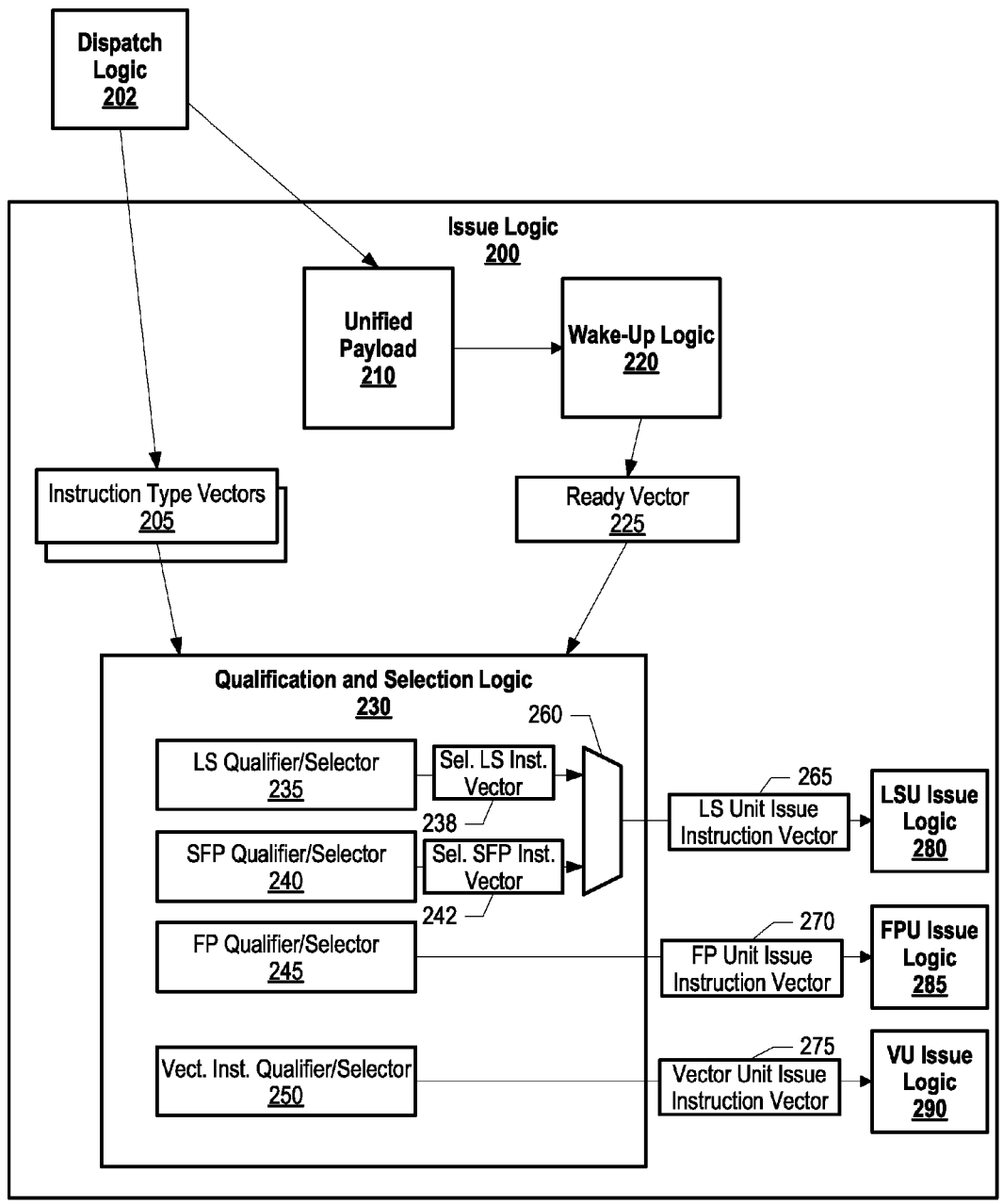
FIG. 2 is an exemplary diagram of issue logic selecting between a simple fixed point instruction and a load-store instruction in which to issue to a load-store execution unit.

FIG. 2 is an exemplary diagram of issue logic selecting between a simple fixed point instruction and a load-store instruction in which to issue to a load-store execution unit. Issue logic 200 receives instructions from dispatch logic 202 and loads the dispatched instructions into unified payload 210. Unified payload 210 holds many different "instruction types," such as a load-store instruction type, a fixed point instruction type, a vector instruction type, and a simple fixed point instruction type. A simple fixed point instruction type is a fixed point instruction that is eligible to execute on a fixed point execution unit or a load-store execution unit due to the instruction's simplicity (e.g., an ADD instruction).

While dispatch logic 202 dispatches an instruction to unified payload 210, dispatch logic also identifies the instruction's instruction type (e.g., included in op code parameters) and updates one of instruction type vectors 205 accordingly. Each of instruction type vectors 205 corresponds to a particular instruction type, such as a load-store instruction type, a simple fixed point instruction type, a fixed point instruction type, and a vector instruction type. For example, dispatch logic 202 may dispatch a fixed point instruction into unified payload 210's entry location "3" and, in this example, dispatch logic 202 sets bit "3" in a fixed point instruction type vector while resetting bit "3" in the other instruction type vectors. Qualification and selection logic 230 utilizes instruction type vectors 205 to identify particular instruction type entry locations (discussed in detail below).

Wake-up logic 220 monitors unified payload 210's instructions and identifies instructions that are ready to issue, such as instructions that are not waiting on a previous instruction's result. In turn, wake-up logic 220 updates ready vector 225 and sets ready bits for each of unified payload 210's entry locations that include ready-to-issue instructions. For example, if unified payload 210's entries 1, 3, and 5 include instructions that are ready to issue, then wake-up logic 220 sets bits 1, 3, and 5 in ready vector 225. In the embodiment discussed herein, wake-up logic 220 sets a ready bit to "1"

when a corresponding instruction is ready to issue, and resets a ready bit to "0" when a corresponding instruction is not ready to issue (see FIG. 5A and corresponding text for further details). In another embodiment, as one skilled in the art can appreciate, issue logic 200 may have an opposite nomenclature.

Qualification and selection logic 230 utilizes instruction type vectors 205 and ready vector 225 to identify particular instruction types and instructions that are ready to issue to respective execution units. Load-store qualifier/selector 235 uses one of instruction type vectors 205 to identify load-store instructions, and uses ready vector 225 to identify which of the load-store instructions are ready to issue. In turn, load-store qualifier/selector 235 generates selected load-store instruction vector 238, which identifies the oldest load-store instruction (longest amount of time in unified payload 210) that is ready to issue. When unified payload 210 does not include any load-store instructions that are ready to issue, selected load-store instruction vector 238 includes all "0" bits (see FIG. 6A and corresponding text for further details).

Simple fixed point qualifier/selector 240 uses one of instruction type vectors 205 to identify simple fixed point instructions, and uses ready vector 225 to identify which of the simple fixed point instructions are ready to issue. In turn, simple fixed point qualifier/selector 240 generates selected simple fixed point instruction vector 242, which identifies the youngest simple fixed point instruction (shortest amount of time in unified payload 210) that is ready to issue.

Multiplexer 260 receives selected load-store instruction vector 238 and selected simple fixed point instruction vector 242, and determines whether a load-store instruction is ready to issue (e.g., determines if selected load-store instruction vector 238 includes a set bit). If so, multiplexer 260 generates load-store unit issue instruction vector 265 that identifies the load-store instruction that is ready to issue. In turn, load-store unit issue logic 280 issues the load-store instruction to a load-store execution unit. However, if no load-store instructions are ready to issue, multiplexer 260 uses selected simple fixed point instruction vector 242 to generate load-store unit issue instruction vector 265. In turn, load-store unit issue logic 280 issues the simple fixed point instruction to the load-store execution unit.

Fixed point qualifier/selector 245 uses one of instruction type vectors 205 to identify fixed point instructions, and uses ready vector 225 to identify which of the fixed point instructions are ready to issue. As a note, simple fixed point instructions are also tagged as fixed point instructions since they are also eligible to issue on a fixed point execution unit. In turn, fixed point qualifier/selector 245 generates fixed point unit issue instruction vector 270, which identifies the oldest fixed point instruction (longest amount of time in unified payload 210) that is ready to issue. In turn, fixed point issue logic 285 issues the identified instruction to a fixed point execution unit.

Due to the fact that load-store unit issue instruction vector 265 identifies the youngest simple fixed point instruction and fixed point unit issue instruction vector 270 identifies the oldest fixed point instruction, a low probability exists that qualification and selection logic 230 identifies a particular simple fixed point instruction to concurrently issue on both the load-store execution unit and the fixed point execution unit unless only one simple fixed point instruction is eligible to issue (making it the youngest instruction and the oldest instruction). When this occurs, issue logic 200 cancels issuing the simple fixed point instruction to the load-store execution unit.

Vector instruction qualifier/selector 250 uses one of instruction type vectors 205 to identify vector type instructions, and uses ready vector 225 to identify which of the vector instructions are ready to issue. In turn, vector instruction qualifier/selector creates vector instruction selection vector 275, which identifies the oldest vector instruction that is ready to issue. In turn, vector issue logic 290 issues the identified instruction to a vector execution unit.

Figure 3:
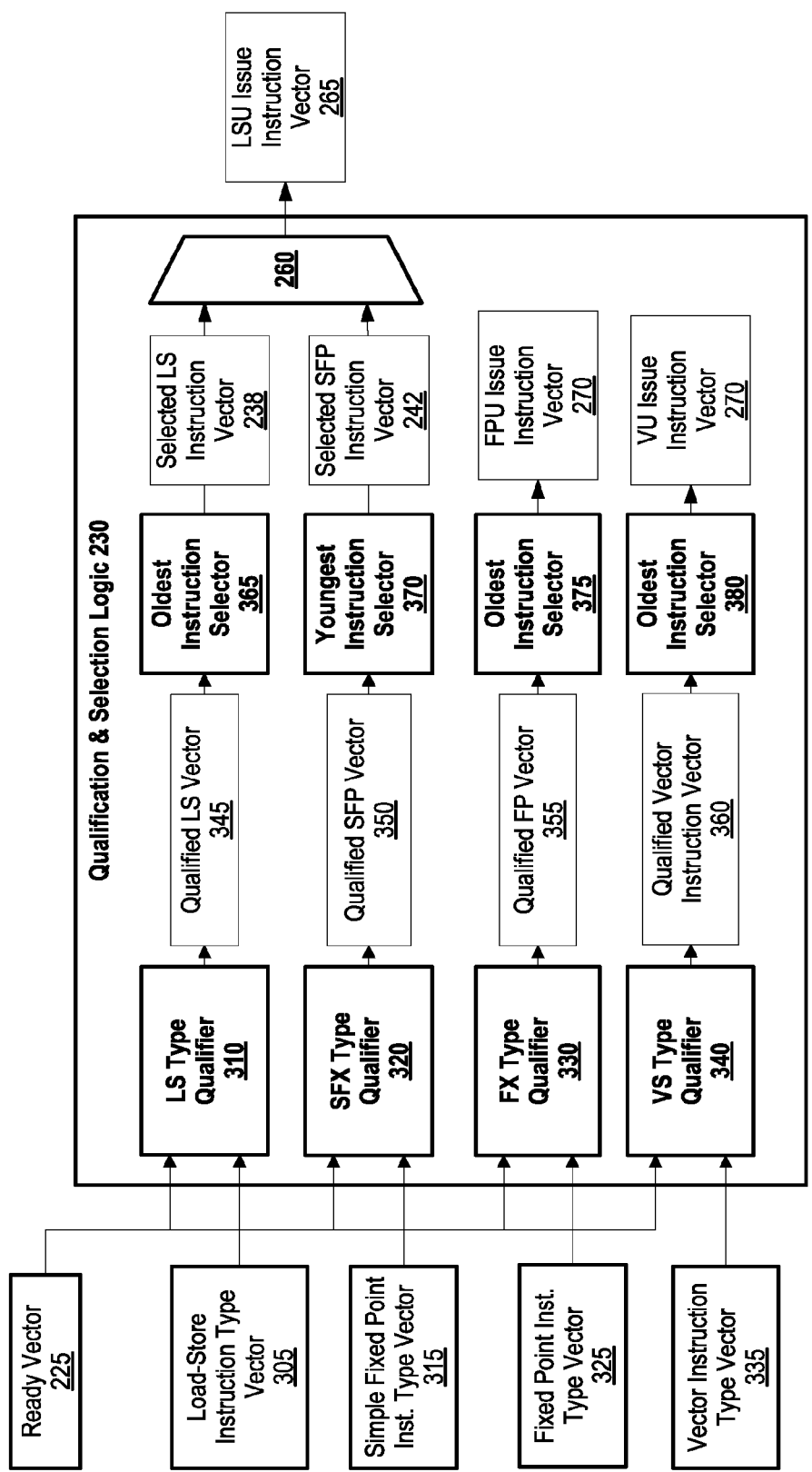
FIG. 3 is an exemplary diagram of qualification and selection logic that identifies instructions that are ready to issue.

FIG. 3 is an exemplary diagram of qualification and selection logic that identifies instructions that are ready to issue. Qualification and selection logic 230 includes instruction qualifiers 310-340, which compare ready vector 225 against respective instruction type vectors 305-335 to identify instructions, of particular instruction types, that are ready to issue. In turn, instruction type qualifiers 310-340 create respective qualified instruction vectors 345-360 that identify instructions of a particular instruction type that are ready to issue (discussed in detail below).

Load-store type qualifier 310 compares ready vector 225 with load-store instruction type vector 305 to identify load-store instructions that are ready to issue. For example, load-store type qualifier 310 may detect that load-store instruction type vector 305's bits 2, 3 and 4 are set, which signify that instructions included in a unified payload's entry locations 2, 3, and 4 are load-store instructions. Continuing with this example, load-store type qualifier 310 may detect ready vector 225's 1, 3, 4, and 7 bits are set, which signify that the instructions included in the unified payload's entry locations 1, 3, 4, and 7 are ready to issue. In this example, load-store type qualifier 310 determines that entry locations 3 and 4 are the only entry locations that include a load-store instruction that is ready to issue.

In turn, load-store type qualifier 310 creates and sets bits in qualified load-store instruction vector 345 accordingly. Using the example described above, load-store type qualifier 310 sets bits 2 and 4 in qualified load-store vector instruction 345 to indicate that the instruction included in the unified payload's entry locations "2" and "4" include load-store instructions that are ready to issue. Oldest instruction selector 365 identifies the "oldest" load-store instruction identified in qualified load-store instruction vector 345, which is the instruction from the ready to issue load-store instructions that have been in the unified payload the longest amount of time. In turn, oldest instruction selector 365 creates and sets bits in selected load-store instruction vector 238 accordingly. Using the example described above, oldest instruction selector 365 may identify that instruction "4" is older that instruction "2" and, therefore, sets bit "4" in selected load-store instruction vector 238.

When selected load-store instruction vector 238 includes a set bit, multiplexer 260 creates and sets the same bit location in load-store unit issue instruction vector 265, which instructs load-store unit issue logic to issue the load-store instruction to a load-store execution unit. However, when selected load-store instruction vector 238 does not have any set bits, indicating that no load-store instructions are ready to issue, multiplexer 260 analyzes selected simple fixed point instruction vector 242 to identify a simple fixed point instruction in which to issue to the load-store execution unit (discussed below).

Simple fixed point type qualifier 320 compares ready vector 225 with simple fixed point instruction type vector 315 to identify simple fixed point instructions that are ready to issue. In turn, simple fixed point type qualifier 320 creates and sets bits in qualified simple fixed point instruction vector 350 accordingly. Youngest instruction selector 370 identifies the "youngest" simple fixed point instruction identified in qualified simple fixed point instruction vector 350, which is the instruction from the ready-to-issue simple fixed point instructions that have been in the unified payload the shortest amount of time. In turn, youngest instruction selector 370 creates and sets bits in selected simple fixed point instruction vector 242 accordingly. As discussed above, when no load-store instructions are ready to issue, multiplexer 260 identifies a bit set in simple fixed point instruction vector 242. In turn, multiplexer 260 creates and sets the same bit location in load-store unit issue instruction vector 265, which instructs load-store unit issue logic to issue the simple fixed point instruction to the load-store execution unit.

Likewise, fixed point type qualifier 330 compares ready vector 225 with fixed point instruction type vector 335 to generate qualified fixed point instruction vector 355, which identifies fixed point instructions that are ready to issue. Oldest instruction selector 375 identifies the oldest fixed point instruction identified in qualified fixed point instruction vector 355. In turn, oldest instruction selector 375 creates and sets bits in fixed point issue instruction vector 270 accordingly, which instructs fixed point unit issue logic to issue the fixed point instruction to a fixed point execution unit. Since youngest instruction selector 370 selects the youngest simple fixed point instruction and oldest instruction selector 375 selects the oldest fixed point instruction, which may be a simple fixed point instruction, a minimal probability exists that qualification and selection logic 230 selects a particular simple fixed point instruction to issue on both a load-store execution unit and a fixed point execution unit.

In addition, vector instruction type qualifier 340 compares ready vector 225 with vector instruction type vector 335 to generate qualified vector instruction vector 360, which identifies vector instructions that are ready to issue. Oldest instruction selector 380 identifies the oldest vector instruction identified in qualified vector instruction vector 360. In turn, oldest instruction selector 380 creates and sets bits in vector issue instruction vector 275 accordingly, which instructs vector unit issue logic to issue the vector instruction to a vector instruction execution unit.

FIG. 4A is an exemplary diagram of a unified payload that holds different instruction types. Dispatch logic, such as dispatch logic 202 shown in FIG. 2, dispatches instructions and loads them in unified payload 210. Unified payload 210 includes different instruction types that execute on different, heterogeneous execution units, such as load-store instructions that execute on a load-store execution unit and fixed point instructions that execute on a fixed point execution unit.

Unified payload 210 includes column 400, which identifies entry locations for instructions. The example shown in FIG. 4A shows that unified payload 210 includes entry locations 0-9. Columns 420 through 460 specify each entry location's "instruction type." Dispatch logic 202 sets a respective instruction type bit when it dispatches an instruction to unified payload 210. Column 420 identifies load-store instruction type instructions (entries 0, 1, 7, and 9). Column 440 identifies simple fixed point instruction type instructions (entries 2, 4, and 8). And, column 460 identifies fixed point instruction type instructions (entries 2-6, and 8). As can be seen, simple fixed point instructions are also identified as fixed point instructions since these instructions are eligible for execution on both a load-store execution unit and a fixed point unit. For simplicity, FIGS. 4A-7 do not reference vector instructions as previously shown in FIGS. 2-3.

FIG. 4B is an exemplary diagram of a load-store instruction type vector that identifies load-store instruction type instructions within a unified payload. Referring to FIG. 4A, column 420 shows that instructions 0, 1, 7, and 9 are load-store instruction types. As such, qualification and selection logic sets bits 0, 1, 7, and 9 in load-store instruction type vector 305. Load-store type qualifier 310, shown in FIG. 3, compares load-store instruction type vector 305 with a ready vector in order to identify load-store instructions that are ready to issue (See FIGS. 5A, 5B, and corresponding text for further details).

FIG. 4C is an exemplary diagram of a simple fixed point instruction type vector that identifies simple fixed point instruction type instructions within a unified payload. Referring to FIG. 4A, column 440 shows that instructions 2, 4, and 8 are simple fixed point instruction types. As such, qualification and selection logic sets bits 2, 4, and 8 in simple fixed point instruction type vector 315. Simple fixed point type qualifier 320, shown in FIG. 3, compares simple fixed point instruction type vector 315 with a ready vector in order to identify simple fixed point instructions that are ready to issue (See FIGS. 5A, 5C, and corresponding text for further details). As discussed below, simple fixed point instructions are also tagged as fixed point instructions since they are eligible to execute on either a load-store execution unit or a fixed point execution unit.

FIG. 4D is an exemplary diagram of a fixed point instruction type vector that identifies fixed point instruction type instructions within a unified payload. Referring to FIG. 4A, column 460 shows that instructions 2, 3, 4, 5, 6, and 8 are fixed point instruction types. As discussed above, simple fixed point instructions are also tagged as fixed point instructions since they are eligible to execute on either a load-store execution unit or a fixed point execution unit. As such, qualification and selection logic sets bits 2, 3, 4, 5, 6, and 8 in fixed point instruction type vector 325. Fixed point type qualifier 330, shown in FIG. 3, compares fixed point instruction type vector 325 with a ready vector in order to identify fixed point instructions that are ready to issue (See FIGS. 5A, 5D, and corresponding text for further details).

FIG. 5A is an exemplary diagram of a ready vector that identifies instructions that are ready to issue. Ready vector 300 includes ready bits 0-9, each corresponding to a unified payload's entry location, such as unified payload 210 shown in FIG. 4A. Once dispatch logic dispatches instructions to the unified payload, wake-up logic, such as wake-up logic 220, identifies which of the dispatched instructions are ready to issue. For example, an instruction may be ready to issue when the instruction is not waiting for a result from a previous instruction (e.g., waiting for the results of an ADD instruction). The wake-up logic sets ready vector 300's bits according to which instructions are ready to issue. The example shown in FIG. 5A shows that instructions 2, 4, 6, and 8 are ready to issue, which qualification and selection logic uses to identify particular instruction types that are ready to issue (see FIGS. 5B-D and corresponding text for further details).

FIG. 5B is an exemplary diagram of a qualified load-store instruction vector that identifies load-store instructions that are ready to issue. Load-store type qualification logic 310 compares ready vector 300 (FIG. 5A) with load-store instruction type vector 305 (FIG. 4B) in order to identify instructions that are load store instructions and are also ready to issue. As can be seen, qualified load-store instruction vector 345 shows that no load-store instructions are ready to issue because ready vector 300 indicates that only instructions 2, 4, 6, and 8 are ready to issue, none of which are load-store instructions based upon load-store instruction type vector 305 (shown in FIG. 4B).

FIG. 5C is an exemplary diagram of a qualified simple fixed point instruction vector that identifies simple fixed point instructions that are ready to issue. Simple fixed point type qualification logic 320 compares ready vector 300 (FIG. 5A) with simple fixed point instruction type vector 315 (FIG. 4C)

in order to identify instructions that are simple fixed point instructions and are also ready to issue. As can be seen, qualified simple fixed point instruction vector 350 shows that instructions 2, 4, and 8 meet such criteria.

FIG. 5D is an exemplary diagram of a fixed point qualified vector that identifies fixed point instructions that are ready to issue. Fixed point type qualification logic 330 compares ready vector 300 (FIG. 5A) with fixed point instruction type vector 325 (FIG. 4D) in order to identify instructions that are fixed point instructions and ready to issue. As can be seen, qualified fixed point instruction vector 355 shows that instructions 2, 4, 6, and 8 meet such criteria.

As can be seen in FIGS. 5C and 5D, both qualified simple fixed point instruction vector 350 and qualified fixed point instruction vector 355 indicate that instructions 2, 4, and 8 are ready to issue. To resolve a potential situation of issuing one of the instructions on both a load-store execution unit and a fixed point execution unit, qualified simple fixed point instruction vector 350 feeds into youngest instruction selector 370, which selects the youngest instruction, and qualified fixed point instruction vector 355 feeds into oldest instruction selector 375, which selects the oldest instruction (see FIGS. 6A-B, and corresponding text for further details).

FIG. 6A is an exemplary diagram of a multiplexer selecting a simple fixed point instruction to issue when a load-store instruction is not available to issue. Load-store type qualifier 310 (FIG. 3) generates qualified load-store instruction vector 345, which indicates that no load-store instructions are ready to issue (see FIG. 5B). As such, oldest instruction selector 365 generates selected load-store instruction vector 238 with all "0's", which indicates that no load-store instructions are ready to issue.

Simple fixed point type qualifier (FIG. 3) generates qualified simple fixed point instruction vector 350, which indicates instructions 2, 4, and 8 are simple fixed point instructions and also ready to issue (see FIG. 5C). Youngest instruction selector 370 determines, in the example shown, that instruction "8" is the youngest instruction of the three instructions, and creates selected simple fixed point instruction vector 242, which sets bit 8.

Multiplexer 260 detects that no load-store instructions are ready to issue based upon selected load-store instruction vector 238. In turn, multiplexer 260 uses selected simple fixed point instruction vector 242 to generate load-store unit issue instruction vector 265, which instructs load-store issue logic to issue the simple fixed point included in the unified payload's entry location "8."

FIG. 6B is an exemplary diagram an oldest instruction selector identifying an oldest fixed point instruction that is ready to issue. Fixed point instruction type qualifier 330 (FIG. 3) generates qualified fixed point instruction vector 355, which indicates that instructions 2, 4, 6, and 8 are fixed point instructions and are also ready to issue (see FIG. 5D). Oldest instruction selector 375 determines, in the example shown, that instruction 2 is the oldest instruction of the four instructions, and creates fixed point unit issue instruction vector 270, which sets bit 2.

Referring to FIG. 6A, load-store unit issue instruction vector 265 identifies instruction 8 (youngest simple fixed point instruction) and fixed point unit issue instruction vector 270 identifies instruction 2 (oldest instruction). As such, the probability of issuing a simple fixed point instruction to both a load-store execution unit and a fixed point execution unit is unlikely unless only one simple fixed point instruction is available to issue and no load-store instructions are ready to issue. In this situation, issue logic cancels issuing the simple fixed point instruction to the load-store execution unit.

Figure 7:
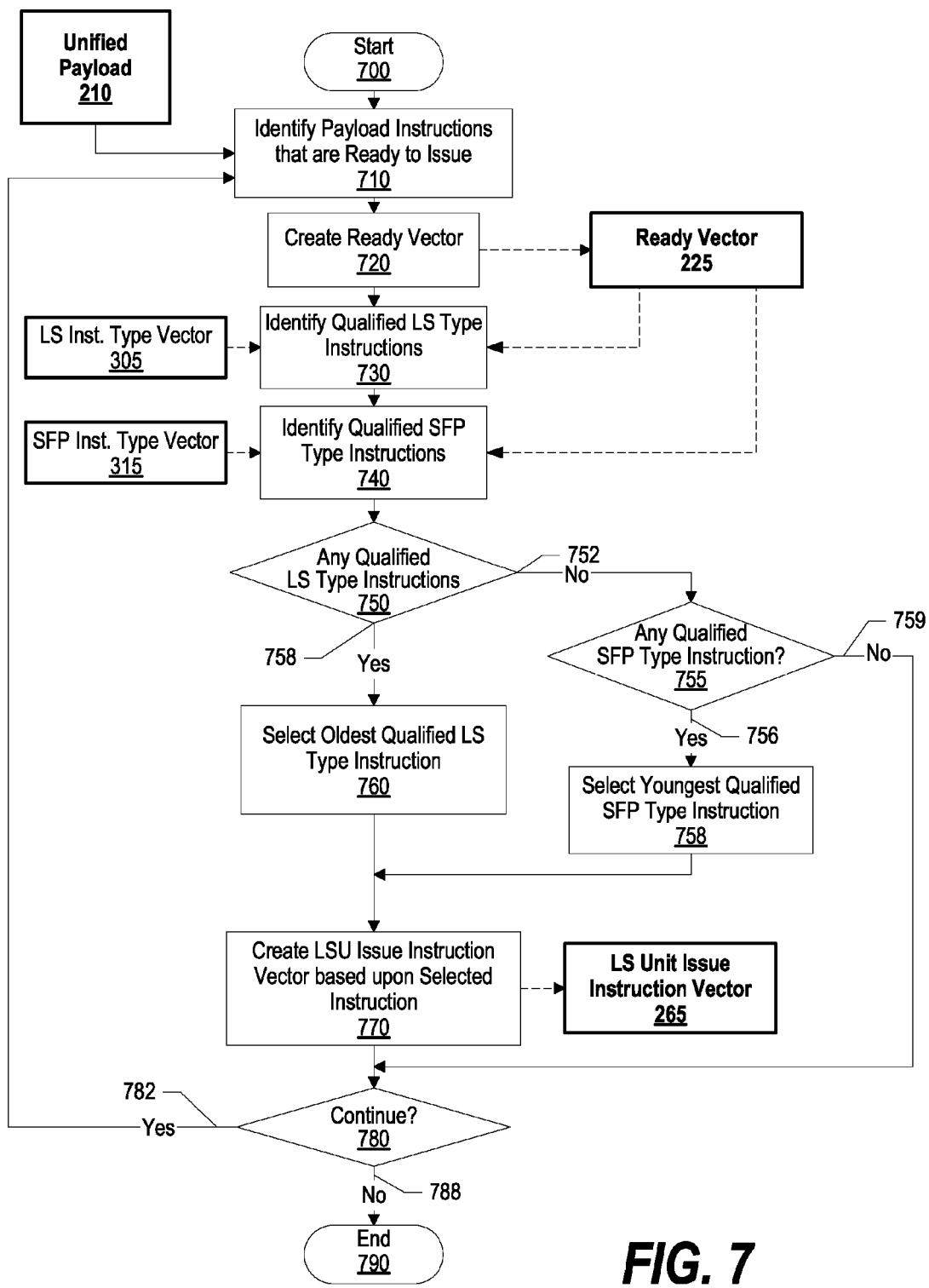
FIG. 7 is a flowchart showing steps taken in issue logic selecting an instruction to issue.

FIG. 7 is a flowchart showing steps taken in issue logic selecting an instruction to issue. Processing commences at 700, whereupon wake-up logic, included in the issue logic, identifies dispatched instructions included in unified payload 210 that are ready to issue (step 710). For example, the wake-up logic identifies instructions that are not waiting for other instructions to complete, such as waiting for the results of a previous ADD instruction. At step 720, the wake-up logic creates ready vector 225, which identifies the dispatched instructions that are ready to issue (see FIG. 5A and corresponding text for further details).

At step 730, qualification and selection logic, included in the issue logic, analyzes ready vector 225 and load-store instruction type vector 305 in order to identify load store instructions that are ready to issue. Load-store instruction type vector 305 includes bits that identify unified payload 210's instructions that are load-store instructions (see FIG. 4B and corresponding text for further details).

At step 740, the qualification and selection logic analyzes ready vector 225 and simple fixed-point instruction type vector 315 in order to identify simple fixed point instructions that are ready to issue. Simple fixed point instruction type vector 315 includes bits that identify unified payload 210's instructions that are simple fixed point instructions (see FIG. 4C and corresponding text for further details).

Next, the qualification and selection logic determines whether any load store instructions are ready to issue based upon step 730 above. If there are any load store instructions ready to issue, the qualification and selection logic branches to "Yes" branch 758 whereupon the qualification and selection logic selects the oldest load store instruction that is ready to issue (step 760). For example, if instructions 1, 3, and 5 are load store instructions that are ready to issue and instruction 5 has been in unified payload 210 the longest, then, in this example, the qualification and selection logic selects instruction "5."

At step 770, the qualification and selection logic creates load-store unit issue instruction vector 265 and sets a bit corresponding to the selected instruction at step 760. Using the example described above, the qualification and selection logic sets bit "5" to correspond with instruction "5." In turn, the qualification and selection logic provides load-store unit issue instruction vector 265 to load store issue logic, which issues the instruction to a load store execution unit.

On the other hand, if there are not any load store instructions that are ready to issue, the qualification and selection logic branches to "No" branch 752 whereupon the qualification and selection logic determines whether there are any simple fixed point instructions that are ready to issue based upon step 740 above (decision 755). If there are no simple fixed point instructions ready to issue, the qualification and selection logic branches to "No" branch 759 bypassing instruction issue selection steps.

On the other hand, if there are any simple fixed point instructions that are ready to issue, the qualification and selection logic branches to "Yes" branch 756 whereupon the qualification and selection logic selects the youngest simple fixed point instruction that is ready to issue (step 758). For example, if instructions 2 and 4 are simple fixed point instructions that are ready to issue and instruction 2 has been in unified payload 210 the shortest amount of time, then, in this example, the qualification and selection logic selects instruction 2. At step 770, the qualification and selection logic creates load-store unit issue instruction vector 265 and sets a bit corresponding to the selected instruction at step 758. Using the example described above, the qualification and selection logic sets bit 2 to correspond with instruction 2. In turn, the qualification and selection logic provides load-store unit issue instruction vector 265 to the load store issue logic, which issues the simple fixed point instruction to the load store execution unit.

The issue logic determines whether to continue monitoring unified payload 210 for dispatched instructions (decision 780). If the issue logic should continue, the issue logic branches to "Yes" branch 782, which loops back to instruct the wake-up logic to monitor dispatched instructions. This looping continues until the issue logic should terminate, at which point the issue logic branches to "No" branch 788 whereupon processing ends at 790.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
   identifying, by issue logic, that a simple fixed point instruction is ready to issue from a unified payload, wherein the simple fixed point instruction is executable by both a fixed point execution unit and a load-store execution unit;
   determining, by the issue logic, that the unified payload does not include a load-store instruction that is eligible to issue to the load-store execution unit; and
   issuing, by the issue logic, the simple fixed point instruction to the load-store execution unit in response to identifying that the simple fixed point instruction is ready to issue and determining that the unified payload does not include a load-store instruction that is eligible to issue.

2. The method of claim 1 further comprising:
   identifying, by the issue logic, a fixed point instruction that is ready to issue, the fixed point instruction executable by the fixed point execution unit;
   detecting, by the issue logic, that the simple fixed point instruction has been in the unified payload a shorter amount of time than the fixed point instruction;
   in response to the detecting, issuing the fixed point instruction to the fixed point execution unit concurrently with issuing the simple fixed point instruction to the load-store execution unit.

3. The method of claim 1 wherein the unified payload includes a plurality of instruction types that correspond to a plurality of heterogeneous execution units.

4. The method of claim 3 further comprising:
   creating a ready vector that includes a plurality of ready bits, wherein each of the plurality of ready bits corresponds to one of the plurality of instructions and each indicates whether the corresponding instruction is ready to issue;
   creating a simple fixed point instruction type vector that includes a plurality of simple fixed point instruction type bits, wherein each of the simple fixed point instruction type bits corresponds to one of the plurality of instructions and each indicates whether the corresponding instruction is a simple fixed point instruction type;
   comparing the ready vector with the simple fixed point instruction type vector;
   in response to the comparing, creating a qualified simple fixed point instruction vector that includes a plurality of qualified simple fixed point instruction bits, wherein each of the qualified simple fixed point instruction bits indicates whether its corresponding instruction is both the simple fixed point instruction type and is ready to issue; and
   utilizing the qualified simple fixed point instruction vector to select the simple fixed point instruction in which to issue.

5. The method of claim 4 wherein the simple fixed point qualified vector identifies a plurality of instructions that are both the simple fixed point instruction type and are ready to issue, the method further comprising:
   detecting, from the identified plurality of instructions, a youngest simple fixed point instruction that has been in the unified payload a shortest amount of time compared with the other identified plurality of instructions; and
   issuing the youngest simple fixed point instruction from the identified plurality of instructions.

6. The method of claim 4 further comprising:
   creating a load-store instruction type vector that includes a plurality of load-store instruction type bits, wherein each of the load-store instruction type bits corresponds to one of the plurality of instructions and each indicates whether the corresponding instruction is a load-store instruction type;
   comparing the ready vector with the load-store instruction type vector;
   in response to the comparing, creating a qualified load-store instruction vector that includes a plurality of qualified load-store instruction bits, wherein each of the qualified load-store instruction bits indicates whether its corresponding instruction is both the load-store instruction type and is ready to issue;

determining that none of the qualified load-store instruction bits are active;

in response to determining that none of the load-store qualified bits are active, creating a load-store unit issue instruction vector that includes an active bit that corresponds to the youngest simple fixed point instruction; and providing the load-store unit issue instruction vector to load-store unit issue logic.

7. The method of claim 3 wherein the unified payload includes instruction type bits that signify the instruction type of each of a plurality of instructions.

8. An information handling system comprising:
one or more processors;
a memory coupled to at least one of the processors;
a unified payload coupled to at least one of the processors;
a nonvolatile storage area coupled to at least one of the processors;
a set of instructions stored in the memory and executed by at least one of the processors in order to perform actions of:
identifying that a simple fixed point instruction is ready to issue from the unified payload, wherein the simple fixed point instruction is executable by both a fixed point execution unit and a load-store execution unit;
determining that the unified payload does not include a load-store instruction that is eligible to issue to the load-store execution unit; and
issuing the simple fixed point instruction to the load-store execution unit in response to identifying that the simple fixed point instruction is ready to issue and determining that the unified payload does not include a load-store instruction that is eligible to issue.

9. The information handling system of claim 8 wherein the set of instructions performs actions of:
identifying a fixed point instruction that is ready to issue, the fixed point instruction executable by the fixed point execution unit;
detecting that the simple fixed point instruction has been in the unified payload a shorter amount of time than the fixed point instruction;
in response to the detecting, issuing the fixed point instruction to the fixed point execution unit concurrently with issuing the simple fixed point instruction to the load-store execution unit.

10. The information handling system of claim 8 wherein the unified payload includes a plurality of instruction types that correspond to a plurality of heterogeneous execution units.

11. The information handling system of claim 10 wherein the set of instructions performs actions of:
creating a ready vector that includes a plurality of ready bits, wherein each of the plurality of ready bits corresponds to one of the plurality of instructions and each indicates whether the corresponding instruction is ready to issue;
creating a simple fixed point instruction type vector that includes a plurality of simple fixed point instruction type bits, wherein each of the simple fixed point instruction type bits corresponds to one of the plurality of instructions and each indicates whether the corresponding instruction is a simple fixed point instruction type;
comparing the ready vector with the simple fixed point instruction type vector;
in response to the comparing, creating a qualified simple fixed point instruction vector that includes a plurality of qualified simple fixed point instruction bits, wherein each of the qualified simple fixed point instruction bits indicates whether its corresponding instruction is both the simple fixed point instruction type and is ready to issue; and
utilizing the qualified simple fixed point instruction vector to select the simple fixed point instruction in which to issue.

12. The information handling system of claim 11 wherein the simple fixed point qualified vector identifies a plurality of instructions that are both the simple fixed point instruction type and are ready to issue, the set of instructions performing actions of:
detecting, from the identified plurality of instructions, a youngest simple fixed point instruction that has been in the unified payload a shortest amount of time compared with the other identified plurality of instructions; and
issuing the youngest simple fixed point instruction from the identified plurality of instructions.

13. The information handling system of claim 11 wherein the set of instructions performs actions of:
creating a load-store instruction type vector that includes a plurality of load-store instruction type bits, wherein each of the load-store instruction type bits corresponds to one of the plurality of instructions and each indicates whether the corresponding instruction is a load-store instruction type;
comparing the ready vector with the load-store instruction type vector;
in response to the comparing, creating a qualified load-store instruction vector that includes a plurality of qualified load-store instruction bits, wherein each of the qualified load-store instruction bits indicates whether its corresponding instruction is both the load-store instruction type and is ready to issue;
determining that none of the qualified load-store instruction bits are active;
in response to determining that none of the load-store qualified bits are active, creating a load-store unit issue instruction vector that includes an active bit that corresponds to the youngest simple fixed point instruction; and
providing the load-store unit issue instruction vector to load-store unit issue logic.

14. The information handling system of claim 10 wherein the unified payload includes instruction type bits that signify the instruction type of each of a plurality of instructions.

15. A computer program product stored in a computer readable medium, comprising instructions that, when executed by an information handling system, causes the information handling system to perform actions that include:
identifying that a simple fixed point instruction is ready to issue from the unified payload, wherein the simple fixed point instruction is executable by both a fixed point execution unit and a load-store execution unit;
determining that the unified payload does not include a load-store instruction that is eligible to issue to the load-store execution unit; and
issuing the simple fixed point instruction to the load-store execution unit in response to identifying that the simple fixed point instruction is ready to issue and determining that the unified payload does not include a load-store instruction that is eligible to issue.

16. The computer program product of claim 15 wherein the information handling system performs actions that include:
- identifying a fixed point instruction that is ready to issue, the fixed point instruction executable by the fixed point execution unit;
- detecting that the simple fixed point instruction has been in the unified payload a shorter amount of time than the fixed point instruction;
- in response to the detecting, issuing the fixed point instruction to the fixed point execution unit concurrently with issuing the simple fixed point instruction to the load-store execution unit.

17. The computer program product of claim 15 wherein the unified payload includes a plurality of instruction types that correspond to a plurality of heterogeneous execution units.

18. The computer program product of claim 17 wherein the information handling system performs actions that include:
- creating a ready vector that includes a plurality of ready bits, wherein each of the plurality of ready bits corresponds to one of the plurality of instructions and each indicates whether the corresponding instruction is ready to issue;
- creating a simple fixed point instruction type vector that includes a plurality of simple fixed point instruction type bits, wherein each of the simple fixed point instruction type bits corresponds to one of the plurality of instructions and each indicates whether the corresponding instruction is a simple fixed point instruction type;
- comparing the ready vector with the simple fixed point instruction type vector;
- in response to the comparing, creating a qualified simple fixed point instruction vector that includes a plurality of qualified simple fixed point instruction bits, wherein each of the qualified simple fixed point instruction bits indicates whether its corresponding instruction is both the simple fixed point instruction type and is ready to issue; and
- utilizing the qualified simple fixed point instruction vector to select the simple fixed point instruction in which to issue.

19. The computer program product of claim 18 wherein the simple fixed point qualified vector identifies a plurality of instructions that are both the simple fixed point instruction type and are ready to issue, the information handling system performing actions that include:
- detecting, from the identified plurality of instructions, a youngest simple fixed point instruction that has been in the unified payload a shortest amount of time compared with the other identified plurality of instructions; and
- issuing the youngest simple fixed point instruction from the identified plurality of instructions.

20. The computer program product of claim 18 wherein the information handling system performs actions that include:
- creating a load-store instruction type vector that includes a plurality of load-store instruction type bits, wherein each of the load-store instruction type bits corresponds to one of the plurality of instructions and each indicates whether the corresponding instruction is a load-store instruction type;
- comparing the ready vector with the load-store instruction type vector;
- in response to the comparing, creating a qualified load-store instruction vector that includes a plurality of qualified load-store instruction bits, wherein each of the qualified load-store instruction bits indicates whether its corresponding instruction is both the load-store instruction type and is ready to issue;
- determining that none of the qualified load-store instruction bits are active;
- in response to determining that none of the load-store qualified bits are active, creating a load-store unit issue instruction vector that includes an active bit that corresponds to the youngest simple fixed point instruction; and
- providing the load-store unit issue instruction vector to load-store unit issue logic.

\* \* \* \* \*